United States Patent [19]
Arrathoon et al.

[11] Patent Number: 4,729,111
[45] Date of Patent: Mar. 1, 1988

[54] OPTICAL THRESHOLD LOGIC ELEMENTS AND CIRCUITS FOR DIGITAL COMPUTATION

[75] Inventors: Raymond Arrathoon, Rochester; Mohammad H. Hassoun, Detroit, both of Mich.

[73] Assignee: Wayne State University, Detroit, Mich.

[21] Appl. No.: 638,984

[22] Filed: Aug. 8, 1984

[51] Int. Cl.$^4$ ............................ G06F 7/56; G02B 6/12
[52] U.S. Cl. .................................. 364/713; 350/96.11
[58] Field of Search ............... 364/713, 822, 845, 841, 364/837; 350/96.11, 96.12, 96.15, 96.2, 96.3

[56] References Cited

U.S. PATENT DOCUMENTS

| | | | |
|---|---|---|---|
| 3,441,724 | 4/1969 | Taylor, Jr. | 364/713 |
| 3,680,080 | 7/1972 | Maure | 364/713 |
| 4,042,814 | 8/1977 | Taylor | 364/713 |
| 4,348,074 | 9/1982 | Burns et al. | 350/96.11 |
| 4,567,569 | 1/1986 | Caulfield et al. | 364/841 |
| 4,579,417 | 4/1986 | Ih | 350/96.11 |
| 4,595,994 | 6/1986 | Verber et al. | 364/841 |
| 4,640,574 | 2/1987 | Unger | 350/96.12 |

FOREIGN PATENT DOCUMENTS

2125184 2/1984 United Kingdom ............. 350/96.11

OTHER PUBLICATIONS

R. Arrathoon et al., "*A High Data Rate Integrated Optical Vector Matrix Multiplier*", SPIE, vol. 466, Los Angeles, Jan. 1984, pp. 81–84.

R. Arrathoon et al., "*Digital Convolution and Correlation with Electro-Optic Bragg Processors*", SPIE, vol. 495, San Diego, Aug. 1984, pp. 150–157.

H. F. Taylor, *Guided Wave Electrooptic Devices for Logic and Computation*, May 15, 1978, vol. 17, No. 10/Applied Optics.

*Primary Examiner*—Gary V. Harkcom
*Assistant Examiner*—Long Thanh Nguyen
*Attorney, Agent, or Firm*—Harry R. Dumont

[57] ABSTRACT

Digital computation is performed on an integrated optical circuit level using optical threshold logic elements. Each input and output optical beam of each element occupies a separate channel and interacts with only one switching component thus assuring true digital computation. These circuits provide access to the entire class of logic functions routinely utilized in electronic digital computers. The integrated optical devices are programmable and are capable of high speed logic operations and reliable digital operation in a complex network.

11 Claims, 18 Drawing Figures

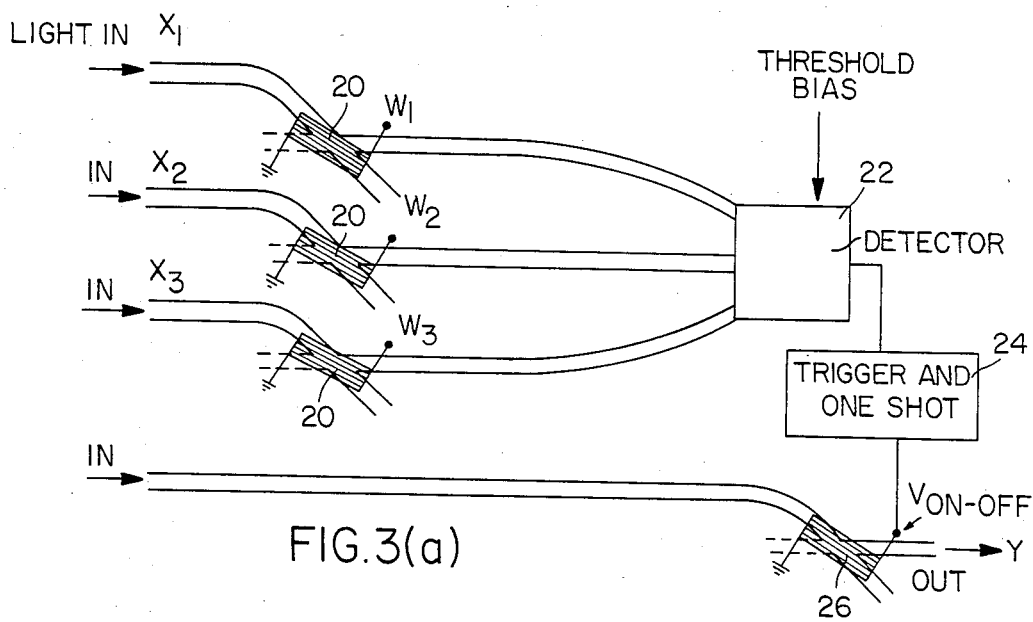
FIG.3(a)
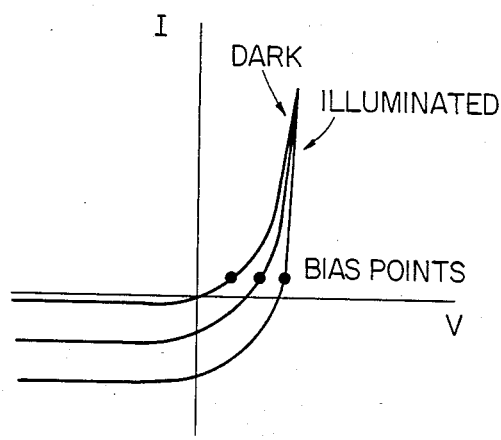
FIG.3(b)
| INPUT | | | OUTPUT | | |
|---|---|---|---|---|---|
| $A_1$ | $A_0$ | $B_0$ | $Z_2$ | $Z_1$ | $Z_0$ |
| 0 | 0 | 0 | 0 | 0 | 0 |
| 0 | 0 | 1 | 0 | 0 | 1 |
| 0 | 1 | 0 | 0 | 0 | 1 |
| 0 | 1 | 1 | 0 | 1 | 0 |
| 1 | 0 | 0 | 0 | 1 | 0 |
| 1 | 0 | 1 | 0 | 1 | 1 |
| 1 | 1 | 0 | 0 | 1 | 1 |
| 1 | 1 | 1 | 1 | 0 | 0 |
FIG.4(a)
|  | $B_0$ | |
|---|---|---|
| $A_1 \ A_0$ | 0 | 1 |
| 00 | | |
| 01 | | |
| 11 | | (1) |
| 10 | | |
FIG.4(b)

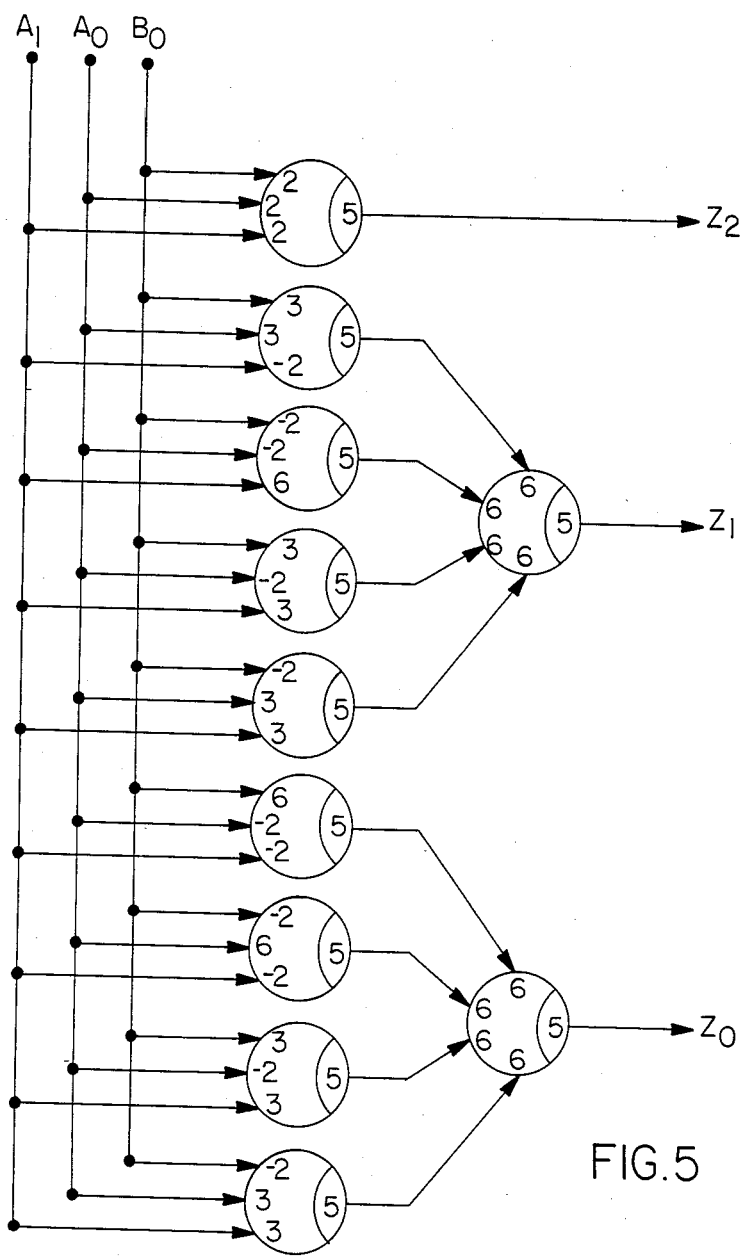
FIG.5
FIG.6(a)
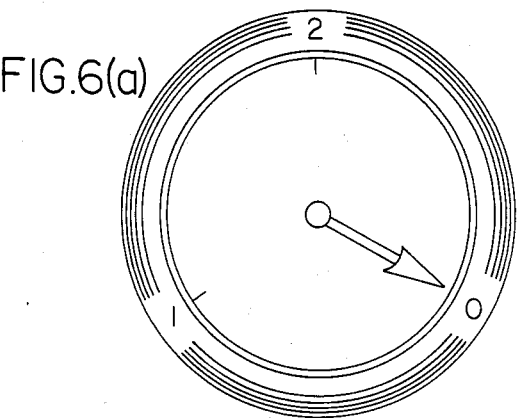
FIG.6(b)
| $+$ | 0 | 1 | 2 |
|---|---|---|---|
| 0 | 0 | 1 | 2 |
| 1 | 1 | 2 | 0 |
| 2 | 2 | 0 | 1 |

| ARABIC | MODULUS SET (2,3) |
|---|---|
| 0 | (0,0) |
| 1 | (1,1) |
| 2 | (0,2) |
| 3 | (1,0) |
| 4 | (0,1) |
| 5 | (1,2) |

| ⊙ | 0 | 1 |
|---|---|---|
| 0 | 0 | 0 |
| 1 | 0 | 1 |

| ⊙ | 0 | 1 | 2 |
|---|---|---|---|
| 0 | 0 | 0 | 0 |
| 1 | 0 | 1 | 2 |
| 2 | 0 | 2 | 1 |

| INPUT | | | | OUT | |
|---|---|---|---|---|---|
| $X_a$ | $X_b$ | $Y_a$ | $Y_b$ | $Z_a$ | $Z_b$ |
| 1 | 0 | 1 | 0 | 1 | 0 |
| 1 | 0 | 0 | 1 | 1 | 0 |
| 0 | 1 | 1 | 0 | 1 | 0 |
| 0 | 1 | 0 | 1 | 0 | 1 |

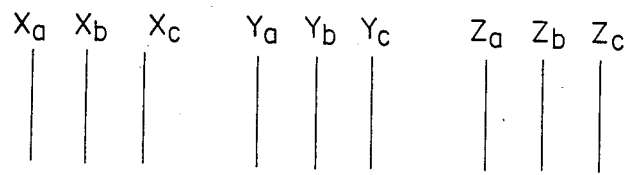
FIG.9(a)
| INPUT | | | | | | OUTPUT | | |
|---|---|---|---|---|---|---|---|---|
| $X_a$ | $X_b$ | $X_c$ | $Y_a$ | $Y_b$ | $Y_c$ | $Z_a$ | $Z_b$ | $Z_c$ |
| 1 | 0 | 0 | 1 | 0 | 0 | 1 | 0 | 0 |
| 1 | 0 | 0 | 0 | 1 | 0 | 1 | 0 | 0 |
| 1 | 0 | 0 | 0 | 0 | 1 | 1 | 0 | 0 |
| 0 | 1 | 0 | 1 | 0 | 0 | 1 | 0 | 0 |
| 0 | 1 | 0 | 0 | 1 | 0 | 0 | 1 | 0 |
| 0 | 1 | 0 | 0 | 0 | 1 | 0 | 0 | 1 |
| 0 | 0 | 1 | 1 | 0 | 0 | 1 | 0 | 0 |
| 0 | 0 | 1 | 0 | 1 | 0 | 0 | 0 | 1 |
| 0 | 0 | 1 | 0 | 0 | 1 | 0 | 1 | 0 |
FIG.9(b)
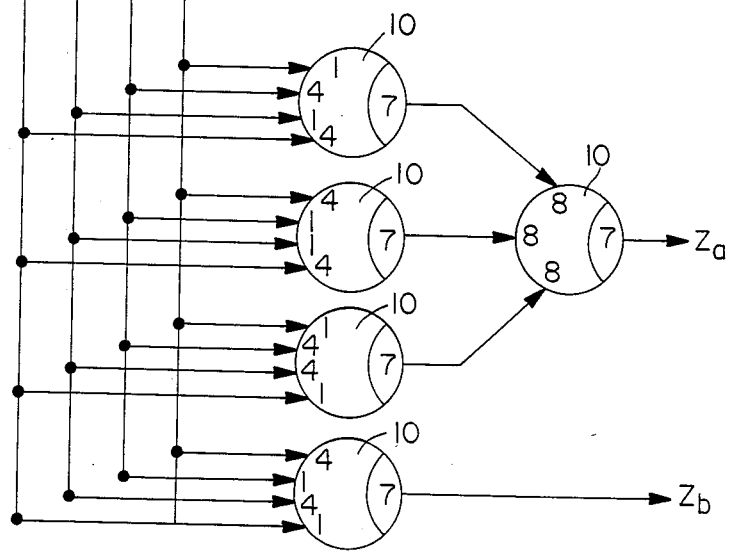
FIG.10

OPTICAL THRESHOLD LOGIC ELEMENTS AND CIRCUITS FOR DIGITAL COMPUTATION

BACKGROUND OF THE INVENTION

In many ways the present state of optical computing may be compared to the period of the early 1950's when electronic computers were making the transition from analog to digital systems. The development of analog systems on an integrated optical circuit sometimes hereinafter referred to as "IOC" has by now achieved a certain degree of maturity. Bulk processing devices which simulate the arithmetic operations of multiplication and addition digitally are just now beginning to emerge. The corresponding devices should have the size and speed capabilities of VLSI circuitry. The application of these devices to high speed residue arithmetic operations is also possible.

An electronic digital computer may be viewed in its most elementary form as an aggregate of simple logic elements such as NAND's and NOR's. When properly interconnected and programmed, these elements combine together to produce the variety of logic functions required for modern computing applications. Simple IOC logic elements are also known in the art. The devices currently in use include directional-couplers, waveguide interferometers, photoconducting overlays, electro-absorption modulators, cut-off switches, bistable devices, pyroelectric cyrstals, cleaved-coupled-cavity ($C^3$) semiconductor lasers, cross channel waveguides with electrooptic mirror electrodes or electrooptic Bragg diffraction electrodes, and crossed channel two-mode interference switches. Each of these devices is relatively large. Their dimensions are usually in the hundreds of microns or more, as opposed to tens of microns or less for VSLI components. Also, light traveling sequentially from one logic element to the next changes amplitude far more quickly than voltage is dropped in a corresponding sequence of electrical switching elements. In a complex IOC network, the digital input-output characteristics of a system based on simple optical logic elements quickly deteriorates making the system unuseable for high component density applications. In the case of the photoconducting overlays, if light does not travel through the channels sequentially, it must be used to activate a number of switches sequentially, which also results in a deterioration of the digital characteristics of the system. The alternatives for all of the simple logic elements are to introduce light repeaters for every few elements or to use thousands of independent light channels. In the light channel approach, the output of each logic element may be converted to an electrical signal and used to switch a corresponding output channel, fed directly from the original source. Both alternatives clearly reduce the packing density of such devices, thus rendering them unacceptably large for commercial use. Optical threshold logic elements in accordance with the present invention provide a solution to this dilemma.

SUMMARY OF THE INVENTION

The present invention will thus be seen to provide a novel digital computer system using optical threshold logic elements in which each input and output otpical beam occupies a separate light channel and cooperates with only one electronic switching device to provide true digital operation. In addition, each optical threshold logic element is more efficient than a simple logic element and is capable of replacing many such elements. The system is applicable to conventional arithmetic computation and to high speed residue arithmetic computation.

BRIEF DESCRIPTION OF THE DRAWINGS

The present invention will now be described with reference to the accompanying specification and to the drawings in which like numerals are used with respect to like parts throughout the several views and in which:

FIG. 3(a) is a combined schematic and functional block diagrammatic drawing showing a guided wave network embodiment of a three input threshold logic element utilizing electrooptic Bragg diffraction modulators and a non-linear diode detector;

FIG. 3(b) is a current voltage waveform diagram showing the characteristics of the diode detector of FIG. 3(a);

FIG. 4(a) is a truth table representing the binary addition of a two bit number with a one bit number;

FIG. 4(b) is a Karnaugh map representing the value of the quantity $Z_2$ of FIG. 4(a);

FIG. 5 is a schematic drawing of a circuit for performing a two plus one bit addition and incorporating threshold logic elements;

FIG. 6(a) is a drawing related to modular arithmetic and showing a modulo 3 clock;

FIG. 6(b) is a table showing modulo (3) cyclic addition;

FIG. 9(a) is a drawing showing modulo 3 light channels for binary multiplication;

FIG. 9(b) is a modulo 3 binary truth table related to FIG. 9(a); and

FIG. 10 is a threshold logic diagram showing a modulo 2 multiplier.

DETAILED DESCRIPTION OF THE PREFERRED EMBODIMENT

Figure 1:
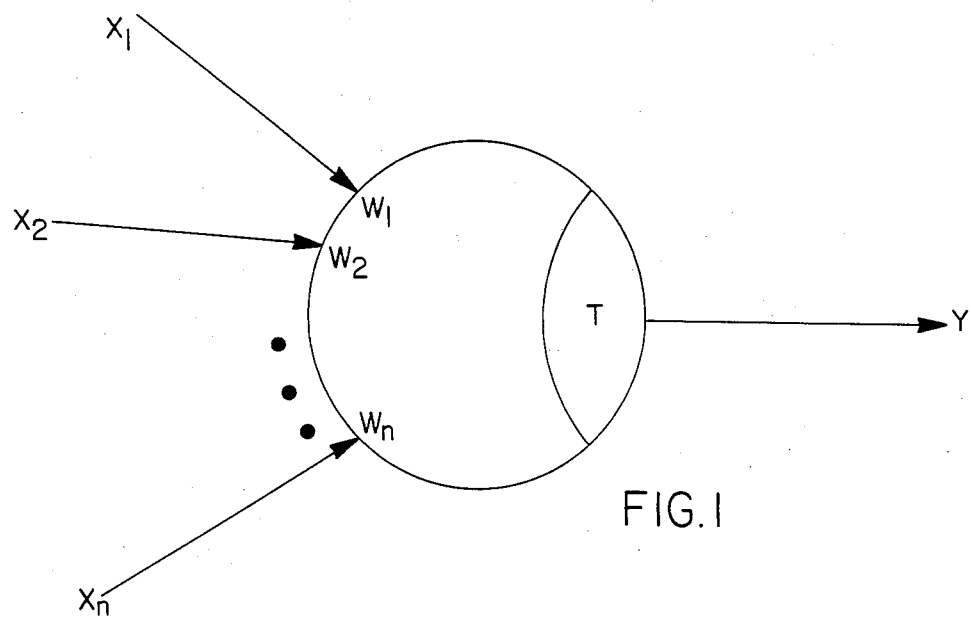
FIG. 1 is a schematic drawing showing an optical threshold logic element.

Optical threshold logic elements consitute a more general class of logic elements than simple gates and are illustrated symbolically in FIG. 1. The $x_i$'s are assumed to be binary input bits with values one or zero. Associated with each bit is a weighting factor, $w_i$·T is an arbitrary threshold value, while y represents the binary output bit. Each element has the following characteristics;

$$y = 1 \text{ if and only if } \sum_{i=1}^{n} w_i \cdot x_i \geq T \quad \text{Equation 1}$$

$$y = 0 \text{ if and only if } \sum_{i=1}^{n} w_i x_i < T \quad \text{Equation 2}$$

Figure 2A:
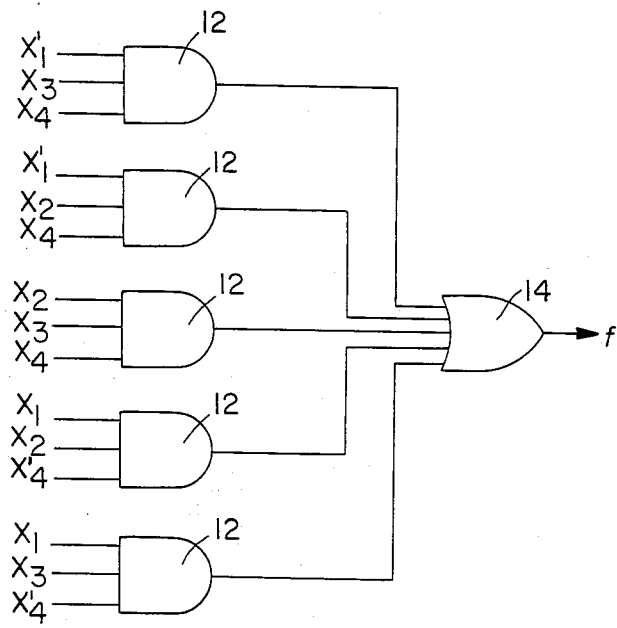
FIG. 2(a) is a schematic drawing showing a diode and-or-gating cricuit for implementing the switching function $$f(x1, x2, x3, x4) = \Sigma(3,5,7,10,12,14,15,);$$
Figure 2B:
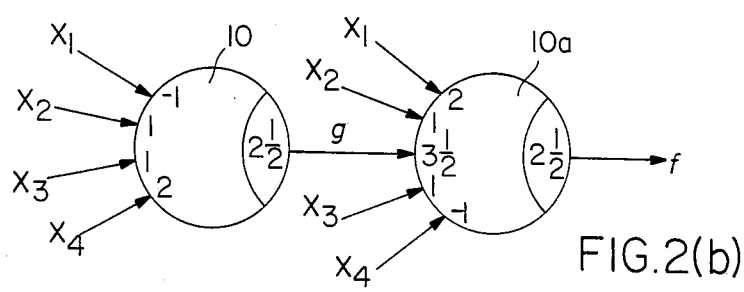
FIG. 2(b) is a schematic drawing showing a threshold logic circuit for performing the same function as FIG. 2(a)

Thus, if the weighted sum of the input bits is greater than the threshold value, an output bit is transmitted. Associated with each threshold element is a switching function, $Y = f(x_1, x_2, \ldots x_n)$, and any general switching function may be realized with a finite number of threshold elements. The function, $f(x_1, x_2, x_3, x_4) = \Sigma(3,5,7,10,12,14,15)$ Equation 3 simply means that of the sixteen possible combinations for four binary bits ($2^4$), seven yield a nonzero output. An order is conventionally assigned by placing $x_1, x_2, x_3, x_4$, in consecutive columns from left to right and arranging the combinations so that the rightmost column consists of alternating 0's and 1's, the next of alternating pairs of 0's and 1's, etc. and numbering the combinations vertically from 0 to 15. Each combination number is thus translated directly into binary. For combination 15 we would expect that $x_1 = x_2 = x_3 = x_4 = 1$, and the output value equals one. Referring to the threshold element implementation of this function in FIG. 2(b) and applying the rules of Eqs. (1) and (2), the weighted sum of the first threshold device 10 is 3, exceeding the threshold value of 2.5 so that g=1. The weighted sum of the second threshold device 10a is 6.5, which exceeds the threshold value of 2.5 so that the output f, equals one as expected. For both threshold devices, the difference between the weighted sum and the threshold value is sufficiently large that the design tolerances are not very critical. Comparing FIG. 2(a) and 2(b), the AND-OR form of this function consists of five AND gates and one OR gate 14. Physically, twenty diodes are required here as opposed to two threshold elements. As the complexity of a particular Boolean function increases or as higher precision is required, the advantages of threshold logic elements with respect to simple logic elements may become more pronounced. Depending upon the particular Boolean function to be implemented, the number of simple logic elements required may be one or several orders of magnitude larger that the equivalent representation by threshold elements. The optical threshold logic elements that will shortly be examined have another advantage. Each input and output optical beam occupies a separate channel, and each interacts with only one switching component. In a complex network of threshold logic elements, the output channels may therefore be coupled directly to the source and switched only once. This suggests the possibility of achieving reliable optical digital operation with these devices.

Before examining the physical characteristics of IOC threshold logic devices, there is another aspect of their behavior that should be considered. In contrast to simple logic elements, the weight and thresholds of these devices are dynamically programmable. Thus, a properly selected general interconnection network may be used to dynamically implement, for example, n-bit addition as well as n-bit multiplication. Electronic threshold elements are not routinely used in VLSI systems. The reason lies in power dissipation and flexiblity limitations. The electronic counterparts of IOC threshold devices require resistors for weighting the inputs; moreover, the resistance values are fixed or at best, using active pull-up transistors, not easily adjusted. Electronic threshold devices are thus not suitable for high packing density applications and are generally not programmable.

One type of three-input IOC threshold logic element 14 is shown in FIG. 3(a). Each input light pulse passes through a crossed channel electrooptic Bragg deflection modulator 20 which weights the intensity of the corresponding bit appropriately. The modulator outputs are evanescently coupled into a detector 22 which then operates an electronic triggering circuit to turn the output channel on as desired. With zero applied voltage, all channels are normally in an off state. In FIG. 3(b), for diode detector 22 the value of the threshold light level required to force a zero crossing may be dynamically programmed simply by adjusting its bias point. This constitutes a threshold sensor. When the light exceeds some predetermined value a given bias will force the current to change sign. The zero crossing may be detected and used to trigger the one shot multivibrator 24 which then applies the electrode voltage required to switch the output channel on for a predetermined time. Thus both the weights and the threshold levels can be dynamically programmed, as can the output waveguide 26 to pass the desired bit or its complement. Each threshold element requires a separate set of light channels and a practical system might consist of a complex channel network; nonetheless, a single laser could serve as the source for a considerable number of the channels. The electrical interface to such a hybrid opto-electronic circuit may be accomplished using well known flip chip mounting techniques.

A simple design exercise based on existing technology may help to illuminate the physical characteristics of the device illustrated in FIG. 3(a). For this purpose it is appropriate to consider a $LiNbO_3$ substrate with titanium indiffused guides. Optical damge thresholds limit their power carrying capabilities, but these effects decrease sharply with increasing wavelength. For 2 micron square channels, a power carrying capability of $\frac{1}{4}$ microwatt at 8500 Å is achievable. If the power carried by the guide is coupled directly to a 5-10% efficient simple p+-n junction silicon solar cell, depending on the fill factor a current of at least 1000 nanoamps at several tenths of a volt will be generated. For a 1 mm² detector, this current level is at least four orders of magnitude above the dark current at 300° K. The diode voltage and current swing may be differentiated with a simple RC circuit to trigger the one shot multivibrator 24 of FIG. 3(a) which then applies the required voltage to the Bragg grating using a high speed Schottky TTL driver. The applied voltage pulse causes an output light pulse to be transmitted. Electrooptic Bragg gratings can be quite fast and response speeds in excess of several hundred MHz should be achievable. There are other possibilities for optical threshold logic elements and it is entirely conceivable that one or more of the digital logic elements discussed earlier may be used to replace segments of the device presented here. As far as the weighting portion is concerned, electro-absorption modulators appear particularly promising, while optically bistable devices eventually may be included in the threshold sensor. Figure 4(a) represents the truth table for the conventional binary addition of a two bit number and a one bit number. The combination of threshold elements which performs this operation is illustrated in FIG. 5. Note that in the case of bit $z_2$ an on condition for the three input bits will result in a weighted sum of 6, which easily exceeds the treshold value of 5. Clearly the design tolerances of the treshold element are not critical. This particular case corresponds to the last entry in the truth table of FIG. 4(a). Similarly, the combination of on and off conditions corresponding to each of the other input entries in the table will provide the correct output bit combination when the rules defined in Eqs. 1 and 2 are applied to the network of FIG. 5. Should a multiplicaton be required, the truth table would clearly differ from that presented in FIG. 4(a). With a more general interconnection network, the only changes that would be required in order to dynamically switch from addition to multiplication would be to alter the weights and thresholds. It should be noted that the arrangement shown in FIG. 4(a) is for illustration only and does not represent the minimum number of threshold elements required to implement the desired function. Indeed sophisticated techniques are available for achieving the required minimization and in the simpler cases this may be done with the aid of Karnaugh maps such as the one indicated in FIG. 4(b). In this example, the specified weights and thresholds were obtained by trial and error. All weights subsequently could be made into positive numbers in accordance with the elementary properties of threshold elements. For a multistage system the elimination of a negative weight physically requires that the output of the preceding stage be dynamically programmed for a complement bit and that the weights and thresholds be dynamically altered as well.

IOC threshold logic elements lend themselvs to residue or modular arithmetic computations. This computational technique is based on cyclic or closed sets of moduli, as opposed to the decimal system in which the same set can count to larger and larger numbers indefinitely. The residue method is quite useful in that it eliminates the need for carries in most algebraic operations. Thus, up to 62 carries are eliminated in a 32 bit multiplication, and the technique becomes increasingly advantageous as the desired bit accuracy increases. This suggests that modular computation on an IOC level may prove particularly useful for high precision number crunching and for large scale image and data processing applications. Residue arithmetic optical computing devices have previously been developed on an IOC level using photoconducting overlays as simple logic elemtns. However, the devices suffered from the inherent limitations discussed earlier for systems based on simple logic elements. Optical threshold logic elements provide an apparent alternative.

Before proceeding to a descripton of the threshold logic implementation of residue arithmetic computations in IOC circuits, it is useful to review some of the features of this type of arithmetic. Modular arithmetic dates back to the Chinese mathematician Sun-Tsu in the first century A.D. Even today, the technique used to convert numbers in the modular representation back to the decimal representation is known as the Chinese Remainder Theorem. In brief, digits in the modular representation are separated by commas and each digit is associated with a particular base that differs from the base selected for any other digit. Parenthesis are generally placed around the entire group of digits. The cyclic property of the individual modulo corresponding to each digit is analogous to the behavior of a clock. In FIG. 6(a), a clock corresponding to modulo 3 is illustrated. A given modulo n contains only the numbers 0 to n−1. Once n-1 is exceeded, the pattern repeats cyclically. Shown in FIG. 6(b) is the truth table for the addition of two modulo three numbers, each taking on the values 0,1,2. When the sum equals three or four, the modulo three representation becomes zero or one, respectively. If uniqueness is to be preserved, this obviously limits the dynamic range unless a second modulo is employed. Unlike the decimal system, the moduli are completely independent of each other and generate no carries. The dynamic range may be defined as:

$$M = x_1 \, x^2 \ldots x_n \qquad (4)$$

Figures 7A, 7B, 7C, 8A, 8B:
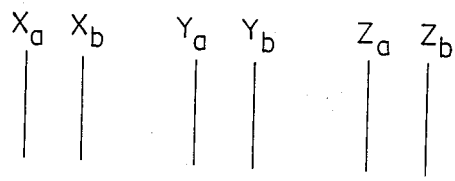
FIG. 7(a) is a table showing decimal-modular equivalents.
FIG. 7(b) is a modulo 2 cyclic truth table.
FIG. 7(c) is a modulo 3 cyclic truth table.
FIG. 8(a) is a drawing showing modulo 2 light channels for binary multiplication.
FIG. 8(b) is a modulo 2 binary truth table related to FIG. 8(a)

FIG. 7(a) illustrates the equivalence between the decimal representation and the modulus set (2,3) over its dynamic range of 6. For this case modular addition or multiplication is performed simply by adding or multiplying the values corresponding to modulo 2, subject to the cyclic limitations discussed earlier, and then repeating the process independently for the modulo 3 terms. In this manner all carries are avoided.

The moduli have been described previously in terms of light guides where light flowing in a particular set of input and output channels corresponds to the modulus representation of a particular arithmetic calculation. For example, in a modulo two light channel multipler, the two inputs and the output each physically require two channels, designated A and B. Within each group of two channels, a light pulse propagating along A represents a one, while a light pulse propagating along B represents a zero, thereby constituting the complete set of numbers required for base two operation. It is assumed that the only condition which are physically permitted in the input channels are the combinations light on in A and off in B, or light on in B and off in A. Similarly, for base three operation, three light channels are required with light on in channel A, B, or C corresponding to zero, one, or two, respectively.

The procedure for implementing an IOC threshold logic realization of a residue multiplier is somewhat more complicated than that followed in the light guide representation, and basically requires that the light channel representation be mapped into a binary truth table in order to permit an entry by entry realization of the desired logic function. From the binary truth table, the appropriate threshold network with associated weights and threshold values may be constructed. As an example of a multiplier for the modulus set (2,3) two cyclic truth tables for multiplication, as shown in FIGS. 7(b) and 7(c), must first be constructed. Each entry in these tables is obtained by taking the sum of the i'th and j'th horizontal and vertical heading, again subject to the cyclic limitations discussed earlier, and placing the result in the ij matrix position. The next step is to convert the cyclic tables to binary format, retaining only the phyically permissable combinations previously described. The conversion of FIGS. 7(b) and 7(c) to binary form is presented in FIGS. 8(b) and 9(b), respectively. The final step is to generate the corresponding threshold network with associated weights and threshold values. For a modulo two multiplexer, the appropriate network is illustrated in FIG. 10.

The application of optical threshold logic devices to residue arithmetic is potentially a very powerful combination. Whether or not the arithmetic aspects will be serious threat to VLSI systems remains to be determined. Nonetheless, it is clear that threshold logic elements actually are more efficient than ordinary electronic logic elements for the implementation of certain Boolean functions. The hybrid optical-electronic system described here may eventually be replaced by an all optical system in order to achieve very high operating speeds. The ultimate utility of IOC optical threshold logic systems is closey linked to the development of smaller and faster optical switching devices and improvements in materials technology.

It will thus be seen that we have provided a novel and improved system and circuit for digital computing employing IOC treshold logic elements.

We claim:

1. An integrated optical threshold logic circuit, comprising:
   a light source;
   a plurality of light input channels connected to said source and a single light output channel;
   separate means for weighting the input in each of said input channels;
   detector means coupled to the combined outputs of all said input channels;
   threshold bias means connected to said detector means for presetting its light level for a zero crossing; and
   triggering means connected between said detector and said output channel for sensing a change in sign and providing an output for switching said output channel on for a predetermined time.

2. The combination as set forth in claim 1 in which a pair of coupled waveguides are mounted in each of said input channels for putting the light source into a binary format.

3. The combination as set forth in claim 1 in which each of said means for weighting comprises a pair of cascaded, dual-channel electrooptically modulated waveguides.

4. The combination as set forth in claim 1 in which each of said means for weighting comprises a pair of cross-channel waveguide modulators.

5. The combination as set forth in claim 1 in which each of said means for weighting comprises a pair of electro-absorptive waveguide modulators.

6. The combination as set forth in claim 1 in which said detector means includes a light sensitive diode.

7. The combination as set forth in claim 1 in which detector means comprises a combination of an optical sensing device and a light sensitive diode.

8. The combination as set forth in claim 1 in which said triggering means comprises a one shot multivibrator.

9. The combination as set forth in claim 1 in which said light source for said input channels comprises at least one laser.

10. The combination as set forth in claim 1 in which a wave guide is connected to said output channel and further connected to the output of said triggering means for switchng the output channel on.

11. An integrated optical threshold logic circuit, comprising;
    a light source;
    a plurality of light input channels connected to said source and a single light output channel;
    separate means for weighting the input in each of said input channels;
    threshold sensor means coupled to the outputs of all said input channels;
    threshold bias means connected to said threshold sensor means for presetting its light level for a zero crossing;
    triggering means connected between said threshold sensor and said output channel for sensing a change in magnitude and switching said output channel on for a predetermined time.

* * * * *

UNITED STATES PATENT AND TRADEMARK OFFICE
CERTIFICATE OF CORRECTION

PATENT NO. : 4,729,111

DATED : March 1, 1988

INVENTOR(S) : Raymond Arrathoon and Mohammad H. Hassoun

It is certified that error appears in the above-identified patent and that said Letters Patent is hereby corrected as shown below:

Column 1, line 63, "threshol" should read --threshold--.
Column 2, line 15, "and-or-" should read --AND-OR --.
Column 2, line 15, "cricuit" should read --circuit--.
Column 3, line 14, "Equation 3" should read --[Equation 3]--.
Column 4, line 37, "damge" should read --damage--.
Column 5, line 1, "treshold" should read --threshold--.
Column 5, line 2, "treshold" should read --threshold--.
Column 5, line 30, "themselvs" should read --themselves--.
Column 5, line 46, "elemtns" should read --elements--.
Column 5, line 50, "descripton" should read --description--.
Column 5, line 61, "Parenthesis" should read --Parentheses--.
Column 6, line 10, "$x^2$" should read --$x_2$--.
Column 7, line 10, "treshold" should read --threshold--.
Column 8, line 21, "switchng" should read --switching--.
Column 8, line 23, ";" should read --:--.
Column 8, line 33, "crossing;" should read --crossing; and--.

UNITED STATES PATENT AND TRADEMARK OFFICE
CERTIFICATE OF CORRECTION

PATENT NO.  : 4,729,111

DATED       : March 1, 1988

INVENTOR(S) : Raymond Arrathoon, et al

It is certified that error appears in the above-identified patent and that said Letters Patent is hereby corrected as shown below:

Column 1, line 64, "otpical" should read --optical--.

Signed and Sealed this

Thirty-first Day of July, 1990

*Attest:*

HARRY F. MANBECK, JR.

*Attesting Officer*     *Commissioner of Patents and Trademarks*